United States Patent
Hsu et al.

(10) Patent No.: US 7,201,814 B2
(45) Date of Patent: Apr. 10, 2007

(54) FIBERS AND RIBBONS CONTAINING PHOSPHOR, CONDUCTIVE METALS OR DIELECTRIC PARTICLES FOR USE IN THE MANUFACTURE OF FLAT PANEL DISPLAYS

(75) Inventors: Che-Hsiung Hsu, Wilmington, DE (US); Christopher J. Roach, Apex, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 64 days.

(21) Appl. No.: 10/466,128

(22) PCT Filed: Jan. 23, 2002

(86) PCT No.: PCT/US02/02997

§ 371 (c)(1),
(2), (4) Date: Jul. 9, 2003

(87) PCT Pub. No.: WO02/061791

PCT Pub. Date: Aug. 8, 2002

(65) Prior Publication Data

US 2004/0050476 A1  Mar. 18, 2004

Related U.S. Application Data

(60) Provisional application No. 60/264,838, filed on Jan. 29, 2001.

(51) Int. Cl.
*B32B 37/00* (2006.01)
*B32B 37/04* (2006.01)
*H01J 9/02* (2006.01)

(52) U.S. Cl. ............... 156/67; 156/89.11; 156/89.23; 156/308.2

(58) Field of Classification Search ........... 156/65, 156/67, 89.11, 89.12, 89.16, 176, 179, 297
See application file for complete search history.

(56) References Cited

U.S. PATENT DOCUMENTS

| | | | |
|---|---|---|---|
| 3,023,137 A * | 2/1962 | Colborne et al. ............. 156/67 |
| 3,256,124 A | 6/1966 | Peyches | |
| 3,684,468 A | 8/1972 | Bode et al. | |
| 4,826,666 A | 5/1989 | Laine | |
| 4,975,104 A | 12/1990 | Kim | |
| 5,011,391 A * | 4/1991 | Kawasaki et al. ............ 445/24 |
| 5,385,499 A | 1/1995 | Ogawa et al. | |
| 5,674,634 A * | 10/1997 | Wang et al. ................. 428/688 |
| 5,714,840 A | 2/1998 | Tanabe et al. | |
| 5,723,945 A | 3/1998 | Schermerhorn | |
| 5,851,732 A | 12/1998 | Kanada et al. | |

(Continued)

FOREIGN PATENT DOCUMENTS

EP   0 951 048 A1   10/1999

(Continued)

*Primary Examiner*—Melvin Mayes

(57) ABSTRACT

This invention is directed to a process for the fabrication of features on a display panel utilizing fibers or ribbons comprising organic polymer and inorganic material, the inorganic material containing phosphoe, conductrice metals or dielectric particles.

11 Claims, 1 Drawing Sheet

U.S. PATENT DOCUMENTS

| | | | |
|---|---|---|---|
| 5,925,203 A * | 7/1999 | Riddle et al. | 156/89.16 |
| 5,992,320 A * | 11/1999 | Kosaka et al. | 101/401.1 |
| 6,014,854 A * | 1/2000 | Greenberg | 57/290 |
| 6,120,975 A * | 9/2000 | Tokai et al. | 430/321 |
| 6,156,141 A * | 12/2000 | Shirakawa | 156/67 |
| 6,560,997 B2 * | 5/2003 | Themont et al. | 65/155 |
| 6,800,166 B2 * | 10/2004 | Kosaka et al. | 156/230 |
| 2003/0029553 A1 * | 2/2003 | Toyoda et al. | 156/230 |
| 2003/0224688 A1 * | 12/2003 | Sugimoto et al. | 445/24 |
| 2004/0009290 A1 * | 1/2004 | Carroll et al. | 427/58 |
| 2005/0051206 A1 * | 3/2005 | Carroll et al. | 136/256 |
| 2005/0051207 A1 * | 3/2005 | Carroll et al. | 136/256 |
| 2005/0051254 A1 * | 3/2005 | Carroll et al. | 156/89.12 |
| 2005/0089679 A1 * | 4/2005 | Ittel et al. | 428/323 |

FOREIGN PATENT DOCUMENTS

| | | | |
|---|---|---|---|
| JP | 49-16217 | | 4/1974 |
| JP | 03-133031 | | 6/1991 |
| JP | 04-229930 | | 8/1992 |
| JP | 08-106020 | | 4/1996 |
| JP | 09-245630 | | 9/1997 |
| JP | 09-330044 | | 12/1997 |
| JP | 10-149763 | * | 6/1998 |
| JP | 10-149764 | | 6/1998 |
| JP | 10-149773 | * | 6/1998 |
| JP | 10149763 | | 6/1998 |
| JP | 10-214568 | | 8/1998 |
| JP | 11-003649 | | 6/1999 |
| JP | 11-149763 | | 6/1999 |
| WO | WO 94/11546 | | 5/1994 |
| WO | WO9506685 | | 8/1995 |
| WO | WO 00/65629 | | 11/2000 |

* cited by examiner

US 7,201,814 B2

FIBERS AND RIBBONS CONTAINING PHOSPHOR, CONDUCTIVE METALS OR DIELECTRIC PARTICLES FOR USE IN THE MANUFACTURE OF FLAT PANEL DISPLAYS

This application is a 35 U.S.C. §371 filing of International Application PCT/US02/02997, filed on Jan. 23, 2002, which claims the benefit of Provisional Application 60/264,838, filed on Jan. 29, 2001.

FIELD OF THE INVENTION

This invention is directed to a fiber or ribbon comprising organic polymer and inorganic materials. The invention is further directed to a process for the fabrication of features on flat-panel displays utilizing such fibers or ribbons.

BACKGROUND OF THE INVENTION

A flat-panel display is an electronic display device composed of an array of display picture elements called pixels, arranged in a two-dimensional matrix. Some examples of a flat-panel display are electroluminescent devices, AC plasma panels, DC plasma panels, PALC (plasma addressed liquid crystal) and field emission displays.

The basic structure of a flat-panel plasma display comprises two glass plates with a conductor pattern of electrodes on the inner surfaces of each plate which is separated by a gas-filled gap. The conductors are configured in a x-y matrix with horizontal electrodes and vertical column electrodes deposited at right angles to each other with thin-film or thick-film photoimaging techniques well known in the art.

For example a plasma display device is shown in FIG. 1, transparent electrodes 1 and addressing electrodes 2 are arranged in the form of a matrix and plasma discharge is produced at selected intersecting points of such electrodes 1 and 2 exciting the fluorescent material 3 which emits light. Barrier ribs 4 being of matrix or linear structure as a display element is arranged between the front glass substrate 5 and the rear glass substrate 6 to form a plurality of cells. Bus electrodes 7 are used for connecting transparent electrodes 1 for display lines which are sequentially selected one by one, erasing cells of the selected display line, and displaying data to the selected cells are shown to be formed on the surface of the transparent electrodes 1 on the front glass substrate 5, a dielectric layer 8 serves as an insulation layer and is formed over the transparent electrodes 1 and the bus electrodes 7. A protective MgO film 9 is formed over the dielectric layer 8.

U.S. Pat. No. 5,851,732, herein incorporated by reference, discloses plasma display panel devices fabricated by using photosensitive thick film conductor compositions wherein a black electrode is present between the substrate and a conductor arrangement electrode, and methods for their manufacture.

U.S. Pat. Nos. 5,385,499; 4,975,104; 5,674,634; 5,723,945, and 5,714,840 disclose variants of plasma display devices and various methods of manufacture.

Resolution and brightness of the images in the AC PDP device depend on electrode width, interconnecting conductor pitch and transparency of the dielectric layer. For example, regarding the conductor pitch, barrier ribs of plasma display panels most desirably have a configuration of about 100 microns in height and are as narrow as possible, preferably less than 20 microns in width and spaced at about 120 microns pitch. This requirement is necessary in order to achieve a color pixel pitch of 72 lines per inch, the printing industry standard point of type, which is equivalent to a sub-pixel pitch of 216 lines per inch with a red, green, and blue phosphor color arrangement. This pattern is commonly used to achieve color output in flat panel and many cathode ray tube displays with diagonal dimensions on the order of 20 to 40 inches used for displaying graphic and textual information in computer terminal equipment and television receivers.

It is difficult to obtain fine line and space resolution for the formation of the electrodes and interconnecting conductor patterns when these materials are applied by conventional patterning techniques such as screen printing, sputtering or chemical etching methods. For the backpanel most of the current barrier rib processes require the electrodes to be patterned first. The present invention will allow the backpanel electrodes, dielectric layers and phosphor channel coatings to be applied after the barrier ribs are created. Therefore the present invention demonstrates the use of fibers or ribbons wherein phosphors, conductive metals or dielectric particles are integrated into a fiber or ribbon structure which is utilized to form various structures used in products for the electronics industry.

SUMMARY OF THE INVENTION

This invention provides a process for the manufacture of various features on a display panel comprising the steps of affixing a fiber or ribbon comprising an organic polymer and an inorganic material to a display panel in a desired orientation; heating the display panel to a temperature above the melting point of the organic polymer; and heating the display panel to a temperature sufficient to effect the essentially complete removal of the organic polymer resulting in the inorganic material affixed to the display panel in the desired orientation.

The invention is also directed to a fiber or ribbon for use in the manufacture of various features of a display panel comprising phosphor, conductive, dielectric particles or mixtures thereof combined with a polymer suitable for forming a spinnable dispersion.

DETAILED DESCRIPTION OF THE INVENTION

Figure 1:
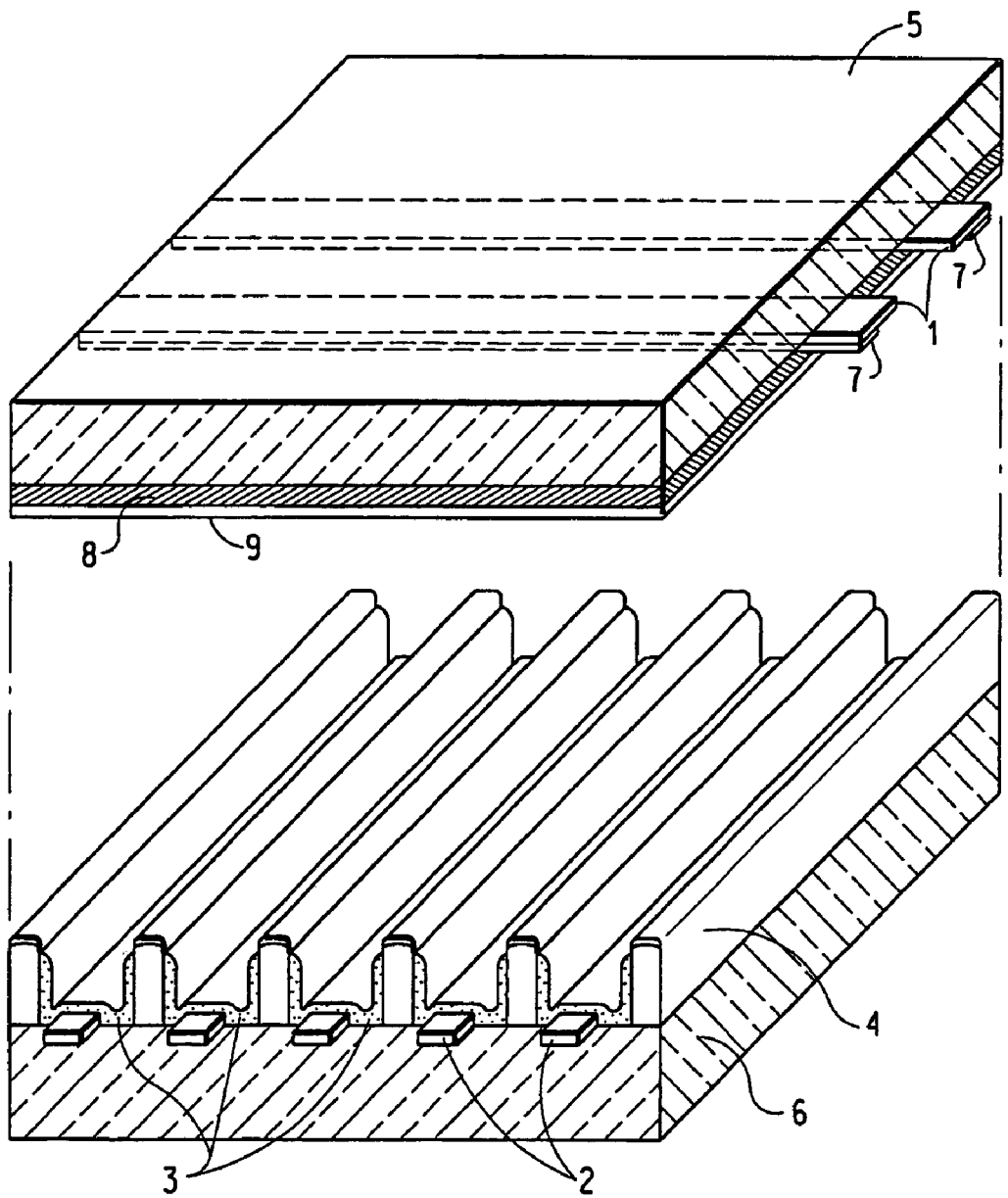
FIG. 1 is an illustration of a plasma display device.

The present invention is directed to methods for the manufacture of flat panel display devices utilizing fibers or ribbons bearing phosphor (phosphorescent) materials, conductive metals or dielectric materials combined with a spinnable fiber-forming dispersion.

Examples of applications for the fibers or ribbons include the manufacture of features on a display panel, for example, barrier rib structures, when the inorganic material of the fiber or ribbon are dielectric particles; bus electrodes or addressing electrodes, when the inorganic particle of the fiber or ribbon are conducting metal or mixture of conducting metal particles; and phosphor sites when the inorganic particle of the fiber or ribbon is a phosphor material.

Polymers suitable for use in the present invention include those that form a spinnable dispersion with particles of inorganic materials such as phosphor particles, conducting metal particles and dielectric material particles. The polymer must be soluble in a suitable solvent so that a dispersion comprising polymer and inorganic material particle can be prepared. The resulting inorganic material bearing polymer dispersion must be capable of being spun into flexible fibers or extruded into flexible ribbons. As used herein, the term "fiber" means a single flexible filament; a group of flexible filaments twisted together or bundled together; or a group of flexible filaments lying parallel to each other forming a bundle. The bundle may or may not be coated to afford protection to the fiber. The term "ribbon" means a flexible strip and may be one homogeneous strip; or may be constructed by laying more than one fiber in the same plane; or may be several homogeneous strips or planes of fibers or combinations thereof layered on top of one another to form a ribbon-like structure. Although preferred that each fiber or strip have the same chemical properties, there are some applications that may deem an intermingling of different chemistries of the individual fibers or strips that form a bundle or ribbon. Fiber diameters typically range from 20 microns to 100 microns but may extend beyond the range for some applications. Ribbon size typically ranges up to 200 microns in width to 100 microns in height but may extend beyond the range for some applications. Length of fiber or ribbon is preferred to be continuous, but noncontinuous fiber or ribbon lengths for forming components is suitable. Further, the polymer must be selected so as to soften and melt cleanly; that is, the polymer must burn out cleanly without leaving behind any residue. The polymer, in the presence of the inorganic material, must exhibit a melting point prior to decomposition. The polymer melt that results from the chosen polymer must wet out the material on which the display panel feature is constructed. Examples of polymers that meet the above selection procedure include ethylene/vinyl acetate copolymers, obtainable from the DuPont Company (Wilmington, Del.) under the trade name ELVAX®.

Organic solvents for use in the preparation of the spinnable inorganic material/polymer dispersion are characterized by high solubility for the polymer and by high vapor pressure at spinning temperatures to facilitate spinning of the inorganic material into polymer fiber or ribbon. Some examples of suitable solvents include tetrachloroethylene, toluene, and xylenes. Dry spinning is a preferred technique for forming a fiber or ribbon. However, wet spinning, melt or gel spinning can be employed. All techniques are well known by those in the art of fiber technology.

Wet spinning is the oldest process. It is used for fiber-forming substances that have been dissolved in a solvent. The spinnerets are submerged in a chemical bath and as the filaments emerge they precipitate from solution and solidify. Because the solution is extruded directly into the precipitating liquid, this process for making fibers is called wet spinning.

Dry spinning is also used for fiber-forming substances in solution. However, instead of precipitating the polymer by dilution or chemical reaction, solidification is achieved by evaporating the solvent in a stream of air or inert gas. The filaments do not come in contact with a precipitating liquid, eliminating the need for drying and easing solvent recovery.

In melt spinning, the fiber-forming substance is melted for extrusion through the spinneret and then directly solidified by cooling.

Gel spinning is a special process used to obtain high strength or other special fiber properties. The polymer is not in a true liquid state during extrusion. Not completely separated, as they would be in a true solution, the polymer chains are bound together at various points in liquid crystal form. This produces strong inter-chain forces in the resulting filaments that can significantly increase the tensile strength of the fibers. In addition, the liquid crystals are aligned along the fiber axis by the shear forces during extrusion. The filaments emerge with an unusually high degree of orientation relative to each other, further enhancing strength. The process can also be described as dry-wet spinning, since the filaments first pass through air and then are cooled further in a liquid bath.

Phosphors, conductive metals and dielectric materials in powder form usable in the process of the present invention are those known by those in the electronics industry. Examples of suitable conducting metals, include those commonly used in display devices, are as follows: Au, Ni, Au/Cr, Au/Cu, Au/Ta, Cu/Cr, Au/indium tin oxide, Cu, Ag and Ni. Ag is the preferred conducting metal. Examples of suitable dielectric materials include alumina and glass frit/alumina mixtures.

Examples of phosphors usable in the process of the present invention are typically those known in the art and may include such phosphors as PI-GIS green phosphor $((Zn,Mn)_2SiO_4)$, KX-501A blue phosphor $((Ba,Eu)MgAl_{10}O_{17})$ and 8018R red phosphor $(Y_2O_3:Eu)$. Fibers comprising 60–70% phosphor by weight and 40–30% polymer by weight have been obtained. Fibers or ribbons comprising 60–70% phosphor, 70–80% conductive metal, or 55–70% dielectric particles by weight are preferred; although, inorganic particle loading up to 90% by weight is suitable. Maximizing the inorganic solids loading will minimize shrinkage of the fibers during firing. However the polymer content must be kept high enough to form a flexible and uniform fiber or ribbon.

The method of affixing the formed fiber or ribbon to the display device surface, or between adjacent ribs on the display panel, may be any method ranging from manual placement to mechanized placement means.

After placement of the fiber or ribbon, the first heating stage heats the display panel that holds the affixed fiber or ribbon to a temperature above the melting point of the organic polymer component of the fiber or ribbon. This adheres the inorganic material/polymer fiber or ribbon to the substrate material.

A second heating stage which substantially to completely burns out the organic polymer from the fiber or ribbon results in the inorganic material adhering to the substrate material. It is preferred that the conductive and dielectric inorganic materials are sintered. The firing temperature profile may be the two heating stages carried out in one continuum of heating or two discretely staged heating events. For example the fiber and/or ribbon placement and initial heating stage can be combined. Heating either the substrate and/or fiber/ribbon during the placement step can be used to secure the fiber/ribbon in the required position on the panel. This would be the preferred positioning method to create functional circuit features where there is no mechanical support structure like a barrier rib channel or groove to hold the fiber and/or ribbon in place. Examples of the unsupported structures would include electrode line arrays, black stripe dielectric line arrays, and stacked ribbon or fiber layers to form barrier ribs. Examples of barrier rib channel supported structures include electrode lines, dielectric coatings, and the red/green/blue phosphor channel coatings. Another alternative method to tack fibers and/or ribbons in place without heating would be to wet the fiber or substrate surface with solvent vapors immediately before positioning (to make the fiber stick to the substrate).

EXAMPLES

Example 1

5.0 g ELVAX® 265 ethylene vinyl acetate resin (DuPont, Wilmington, Del.) was first soaked with 30 ml tetrachloroethylene (TCE) in a 100 ml beaker for one half hour. The beaker wrapped with a round band heater was enclosed in a bell jar. An airdriven stirrer was situated at the center of the bell jar for stirring the mixture in the beaker. The mixture was heated to 100° C. until the polymer dissolved. 7.5 g P1-G1S green phosphor [$(Zn,Mn)_2SiO_4$] (Kasei Optonix) was then added to the solution. It was stirred for about four hours. Once the mixture looked very smooth, vacuum was applied to the bell jar to thicken the mixture until an extensible viscosity was obtained. The mixture was then tested with a spatula to ascertain that fiber could be pulled from the smooth, thick paste. Once a smooth, fluid mixture was achieved, it was transferred to a plastic syringe having a ~0.5 mm diameter hypodermic needle for extrusion. The paste had to be kept at ~80° C. while it was being extruded to TEFLON® fluoropolymer sheets (DuPont, Wilmington, Del.) for forming continuous fibers. Long fibers as thin as 50 microns were obtained easily from the extrusion. The obtained fibers were elastic and could be handled easily without breaking, which makes it possible for further processing into components of plasma display panels. Thin ribbons down to 50 microns in thickness were obtained if the extrudates came into contact with the TEFLON® fluoropolymer sheets (DuPont, Wilmington, Del.) before the skin of the extrudate had solidified.

Example 2

A smooth fiber forming paste containing a blue phosphor was made in the same manner as above by first making a solution of 5.0 g ELVAX® 265 ethylene vinyl acetate resin/30 ml TCE, then adding to the solution, 12.5 g KX-501A blue phosphor [$(Ba, Eu)MgAl_{10}O_{17}$] (Kasei Optonix). Fibers having diameter less than 100 microns were obtained. With the same process as described above, thin ribbons were obtained.

Example 3

A smooth fiber forming paste containing red phosphor was made in the same manner as above by first making a solution of 5.0 g ELVAX® 265 ethylene vinyl acetate resin/30 ml TCE then adding to the solution, 9.1 g spherical red phosphor ($Y_2O_3$:Eu). Fibers having diameters as thin as 50 microns were obtained. With the same process as described in Example 1 above, thin ribbons were obtained.

Example 4

A smooth fiber forming paste containing green phosphor was made in the same manner as above by first making a solution of 5.0 g ELVAX® 265 ethylene vinyl acetate resin/40 ml toluene. To the solution, 7.5 g P1-G1S green phosphor (Kasei Optonix) was added. Fibers having diameter less than 50 microns were obtained. With the same process as described in Example 1 above, thin ribbons were obtained.

Example 5

A smooth fiber forming paste containing silver particles was made in the same manner as described in Example 1 by first making a solution of 5.0 g ELVAX® 265 ethylene vinyl acetate resin/30 ml TCE. To the solution, 15.0 g P3031 silver powder (silver powder, nominal size ~2 um D50 [~0.5 um D10, ~7 um D90] available from E. I. duPont de Nemours and Company, Wilmington, Del.) and 0.4 g glass frit were added. Fibers ranging from 100 to 300 microns were obtained. With the same process as described in Example 1, thin ribbons could be obtained.

| Glass Frit Composition (given in weight %) | |
|---|---|
| $Bi_2O_3$ | 82.0 |
| PbO | 11.0 |
| $B_2O_3$ | 3.5 |
| $SiO_2$ | 3.5 |
| Milled to nominal S.A. of 5.5 $m^2/g$ | |

Example 6

A smooth fiber forming paste containing dielectric particles (frit and alumina) was made in the same manner as described in Example 1 by first making a solution of 5.0 g ELVAX® 265 ethylene vinyl acetate resin/30 ml TCE. To the solution, 8.14 g glass frit and alumina filler composition (22.5% Frit A+54.3% Frit B+23.2% alumina filler powder, weight %, based on solids), as shown below, was added. Fibers having diameter down to less than 100 microns were obtained. With the same process as described in Example 1 above, thin ribbons could be obtained.

| Glass Composition (given in weight %) | | | |
|---|---|---|---|
| Frit A | | Frit B | |
| PbO | 65.96 | PbO | 62.05 |
| $SiO_2$ | 14.81 | $SiO_2$ | 30.82 |
| $B_2O_3$ | 11.83 | ZnO | 2.72 |
| ZnO | 6.58 | $Al_2O_3$ | 2.57 |
| $Al_2O_3$ | 0.82 | $B_2O_3$ | 1.84 |

Example 7

A small piece of fiber made in Example 2 was placed on a microscope slide which was then placed in a Fischer Furnace for air firing according to the following cycle: RT to 80° C. (5° C./min), 30 mins at 80° C., 80° C. to 120° C. (10° C./min), 20 mins at 120° C., 120° C. to 490° C. (2° C./min), 30 mins at 490° C., 490° C. to 300° C. (20° C./min), 1 min at 300° C., 300° C. to RT (10° C./min).

The air-fired sample was placed under a U.V. microscope, which showed exceptional uniformity of phosphorescence. The result illustrated that the fiber forming process did not destroy phosphorescence property of KX-501A blue phosphor.

Example 8

A small piece of fiber made in Example 3 was air-fired in the same manner as described in Example 7. The air-fired sample also shows exceptional uniformity of phosphorescence under a U.V. microscope.

Example 9

Phosphor particles were placed in the grooves of a rib barrier structure of a plasma display panel via phosphor bearing fibers. The test rib barrier structure consisted of parallel ribs with 80 micron spacing between two adjacent ribs placed on a 2 mm thick glass plate. Each rib was about 116 micron in width and 42 micron in height. The rib structure comprised sintered alumina powder encapsulated by glass frit.

| Glass Frit Composition (given in weight %) | |
|---|---|
| $SiO_2$ | 56.5 |
| PbO | 17.2 |
| $Al_2O_3$ | 9.1 |
| CaO | 8.6 |
| $B_2O_3$ | 4.5 |
| $Na_2O$ | 2.4 |
| $K_2O$ | 1.7 |
| Milled to nominal S.A. of 4.2 $m^2/g$ | |

A one centimeter long piece of ~80 micron diameter phosphor containing fiber prepared in Example 1 was placed in one of the grooves between two adjacent ribs on a small glass plate. Placement of oversize (with respect to diameter) phosphor bearing fibers in the grooves of the test barrier rib structure did not present a problem since the fiber was elastic and strong enough to be forced into the grooves. The test barrier rib structure bearing the phosphor bearing fiber was placed in a Fischer Furnace for air firing according to the following cycle: RT to 80° C. (5° C./min), 30 mins at 80° C., 80° C. to 120° C. (10° C./min), 20 mins at 120° C., 120° C. to 482° C. (2° C./min), 30 minutes at 482° C., 482° C. to RT in about 5 hours.

Microscopic examination of the air-fired sample clearly showed a dense concave structure of phosphor in the groove in which the phosphor-bearing fiber had been placed. The phosphor particles adhered to the entire wall of both adjacent ribs. The air-fired sample was heated to 550° C. and kept there for 10 minutes. Upon cooling, the dense structure appeared unchanged, indicating that the original firing sequence had removed the organic polymer. The dense structure phosphoresced when exposed to U.V. light.

Example 10

A small piece of 250 micron diameter silver particle bearing fiber made in Example 5 was placed on a glass slide which was then placed in a Fischer Furnace for air-firing according to the following cycle: RT to 80° C. (2° C. min), 30 mins at 80° C., 80° C. to 120° C. (10° C./min), 20 mins at 120° C., 120° C. to 482° C. (5° C./min), 30 mins at 482° C., 482° C. to 215° C. (25° C./min), 20 mins at 215° C., 215° C. to 25° C. (25° C./min).

Microscopic examination revealed that the silver particle bearing fiber of 250 micron original diameter had been converted to a flat deposition of silver with a width of 300 microns, demonstrating that the ELVAX® 265 ethylene vinyl acetate resin had flowed during the air-firing. The silver particles coalesced or sintered by the air firing could not be removed from the glass slide. Electrical resistance of the resulting silver deposition, as determined with two electrical probes 1 cm apart, was zero, too small to be measured. The result demonstrated that the silver particle bearing fiber as produced by the present invention could be used for fabrication of bus electrodes or addressing electrodes.

Example 11

A small piece of ~80 micron diameter dielectric particle bearing fiber made in Example 6 was placed on a glass slide which was then placed in a Fischer Furnace for air-firing according to the following cycle: RT to 80° C. (2° C. min), 30 mins at 80° C., 80° C. to 120° C. (10° C./min), 20 mins at 120° C., 120° C. to 525° C. (5° C./min), 30 mins at 525° C., 525° C. to 215° C. (25° C./min), 20 mins at 215° C., 215° C. to 25° C. 25° C./min)

Examination under a microscope revealed that the air firing had coalesced or sintered the dielectric particles. The resulting deposition of dielectric could not be removed from the glass slide. The result demonstrated that the dielectric particle-bearing fiber could be used for fabrication of the barrier rib structure, contrast dielectrics, or overglaze layers of plasma display panels.

What is claimed is:

1. A process for the manufacture of features on a display panel comprising the steps of:
    a) placing a spun fiber or a ribbon, the ribbon comprising more than one spun fiber, onto a display panel substrate in a desired orientation to form an article,
        the spun fiber or the spun fiber of the ribbon being formed by spinning a dispersion comprising an organic polymer and an inorganic material;
    b) heating the article to a temperature above the melting point of the organic polymer to a adhere the spun fiber or the ribbon to the display panel substrate; and
    c) further heating the article to a temperature sufficient to effect removal of the organic polymer from the spun fiber or the ribbon resulting in the inorganic material remaining affixed to the substrate in the desired orientation with the proviso that no solvent is added to the formed spun fiber or the formed ribbon to adhere the spun fiber or the ribbon to the display panel substrate.

2. The process of claim 1 wherein the adhered spun fiber or the adhered ribbon comprises the inorganic material in the form of phosphor particles and is deposited between adjacent barrier ribs of a display panel.

3. The process of claim 1 wherein the adhered spun fiber or the adhered ribbon comprises the inorganic material in the form of metal particles and is deposited as an electrode.

4. The process of claim 1 wherein the adhered spun fiber or the adhered ribbon comprises the inorganic material in the form of dielectric particles and is deposited as a barrier rib.

5. The process of claim 1 further comprising forming the spun fiber by wet spinning.

6. The process of claim 1 further comprising forming the spun fiber by melt spinning.

7. The process of claim 1 further comprising forming the spun fiber by gel spinning.

8. The process of claim 1 further comprising forming the spun fiber by dry spinning.

9. The process of claim 1 wherein the inorganic material is phosphor.

10. The process of claim 1 wherein the inorganic material is conductive.

11. The process of claim 1 wherein the inorganic material is dielectric.

* * * * *